United States Patent Office 3,645,870
Patented Feb. 29, 1972

3,645,870
PROCESS FOR PREPARING VINYL CHLORIDE POLYMERS OR COPOLYMERS HAVING BUTADIENE AND ACRYLATE MONOMERS RADIATION GRAFTED THERETO
Norio Sagane, Kyoto-shi, and Hiroshi Harayama and Yotaro Morishima, Osaka-fu, Japan, assignors to Sekisui Kagaku Kogyo Kabushiki Kaisha, Osaka-shi, Japan
No Drawing. Filed July 14, 1969, Ser. No. 841,539
Claims priority, application Japan, July 20, 1968,
43/51,488
Int. Cl. C08d 9/08; C08f 1/16, 29/12
U.S. Cl. 204—159.17                    6 Claims

ABSTRACT OF THE DISCLOSURE

Process for producing high-impact resins comprising graft polymerizing alkyl acrylate or alkyl methacrylate monomer, butadiene, and vinyl chloride-containing resin powder by impregnating the vinyl chloride resin with the monomer and irradiating the impregnated powder with ionizing radiation while in contact with gaseous butadiene to provide products having superior durability; together with the products obtained thereby.

BACKGROUND OF THE INVENTION

Polyvinyl chloride resins are generally poor in impact strength. Attempts have been made to improve the impact strength of polyvinyl chloride resins by blending ABS resin with the polyvinyl chloride resin, or by graft polymerizing a conjugated diene monomer to the polyvinyl chloride resin to provide a graft polymer. Unfortunately, the products obtained by these methods are unsatisfactory because they are poor in weatherability. For example, the ABS-polyvinyl chloride composition or graft polymer rapidly deteriorates in impact strength when exposed to ultraviolet radiation, and accordingly such composition or graft polymer is not suitable for use outdoors.

Recently, attempts have been made to improve the impact strength of polyvinyl chloride resin by blending therewith a chlorinated polyethylene or chlorosulfonated polyethylene. Although these compositions are somewhat improved in weatherability by comparison to the ABS-polyvinyl chloride composition or graft polymer, these later compositions have recently been found to be poorer in workability, transparency, and mechanical strength. This occurs because chlorinated polyethylene or chlorosulfonated polyethylene is poorly compatible with polyvinyl chloride resin.

Experiments have been carried out to improve the impact strength of polyvinyl chloride resin by graft polymerizing it with alkyl acrylate or alkyl methacrylate and butadiene. This method comprises adding alkyl acrylate or methacrylate and butadiene to polyvinyl chloride resin, maintaining the alkyl acrylate or alkyl methacrylate and butadiene in a liquid state, and irradiating the liquid mixture to accomplish a graft polymerization. However, the product so obtained has been found to be deficient both in weatherability and impact strength.

THE INVENTION

The present invention provides a process for preparing high-impact resin with excellent weatherability. Briefly, the process comprises impregnating a polyvinyl chloride-containing resin powder with alkyl acrylate or alkyl methacrylate or mixtures thereof and irradiating the impregnated powder with ionizing radiation in the presence of gaseous butadiene to form a graft polymer. The present invention also contemplates the products so produced.

The polyvinyl chloride resin-containing powder used according to the present invention can be a homopolymer of vinyl chloride or a copolymer having vinyl chloride as the main monomer together with another polymerizable monomer. Examples of such polyvinyl chloride-containing resins include vinyl copolymers such as vinyl chloride-vinyl acetate, vinyl chloride-ethylene, and the like. The copolymer according to the present invention also includes vinyl terpolymers such as ethylene-vinyl acetate-vinyl chloride terpolymer, as well as halogenated polyvinyl chlorides such as chlorinated polyvinyl chloride and the like. Such polyvinyl chloride-containing resins are also referred to hereinafter as polyvinyl chloride resins or vinyl chloride resins. The vinyl chloride resin is utilized in particulate or powder form. The powder can be produced by a conventional process of suspension polymerization, emulsion polymerization, or bulk polymerization or by crushing or otherwise finely subdividing the resin. It is generally preferred to produce the polyvinyl chloride by the suspension polymerization method because the polyvinyl chloride resin so obtained is porous and can be rapidly impregnated with a large amount of the alkyl acrylate or methacrylate monomer. Moreover, even after impregnation of such resin, the particle surface is not sticky, and additionally, there is a large surface area for contact with the gaseous butadiene.

The alkyl acrylate and alkyl methacrylate used in the practice of the present invention are monomers in which an alkyl group is ester-linked with the carbonyl group of acrylic acid or methacrylic acid. The properties of these monomers with respect to affinity for the vinyl chloride resin, graft polymerization reactivity with the resin, and the properties of the graft polymer so obtained can be varied as a function of the alkyl chain length. Straight or branched-chain alkyl groups can be used. Monomers containing alkyl groups having from about one to about eight carbon atoms are particularly preferred. The monomers can be used singly or in admixture of two or more alkyl acrylates and/or methacrylates.

In another aspect of the invention the monomers can be used in admixture with a styrene monomer such as styrene, o-methyl styrene, p-methyl styrene, and the like. When the monomers include a styrene compound, the resulting vinyl chloride graft polymer can be further improved in transparency, tensile strength, and other properties.

In the process of the present invention, impregnation of the vinyl chloride resin powders with the monomer or monomer mixture can be carried out by any convenient method. Thus, the blending of monomer and vinyl chloride resin can be carried out by means of a mixing apparatus such as a kneader, a blending mixer, and the like. With such apparatus, the resin is rapidly impregnated with monomer.

It is desirable in the practice of this invention to control the ratio of vinyl chloride resin to alkyl acrylate and methacrylate monomer. The monomer can be used in the theoretical or stoichiometric amount necessary for graft polymerization to vinyl chloride resin, or it can be in excess because the excess amount does not participate in the polymerization but remains in the monomeric state. However, if the amount of monomer is more than about 50 parts for each 100 parts of vinyl chloride resin, the impregnated powder is not a substantially uniform powder, and this results in non-uniform contact with the gaseous butadiene. The theoretical amount of the monomer is about 30 parts for each 100 parts of powder. The broad range is thus from about one to about 50 parts of monomer for each 100 parts of the vinyl chloride resin powder. The preferred graft polymer according to the present invention is obtained by graft polymerizing from about one to about 30 parts of monomer to 100 parts vinyl chloride resin. All parts, proportions, percentages, and ratios herein are by weight unless otherwise stated.

In the process of the present invention, the monomer-impregnated resin powder is contacted with gaseous butadiene because the graft polymer so produced has singularly good qualities. The contact of gaseous butadiene and impregnated powder can be such that one moves and the other is stationary or both can be stationary.

In the process of the present invention the monomer-containing vinyl chloride resin in contact with gaseous butadiene is exposed to ionizing radiation. Ionizing radiation is taken to mean either particulate or electromagnetic radiation. Thus, neutron, electron, alpha particle, beta particle, X-ray, or gamma radiation and the like can be utilized. The graft polymerization is thus carried out by ionizing radiation.

The degree of grafting is a function of the total irradiation dose, so the total irradiation dose is determined by the desired degree of grafting. In the present invention, the total irradiation dose is preferably in the range of $10^3$ to $10^8$ rad.

During the process of the present invention, the gaseous butadiene is consumed, and further gaseous butadiene is supplied as necessary during the graft polymerization. Accordingly, the degree and extent of graft polymerization can be ascertained by the quantity of gas supplied. On the other hand, if the relationship between irradiation time and the degree of graft polymerization at various temperatures and with various dosages of ionizing radiation is previously determined, the ratio of monomer and butadiene graft-polymerized to the vinyl chloride resin can be estimated on the basis of the above relationship. Thus, the ratio of monomer and butadiene to be graft-polymerized to the vinyl chloride resin can be regulated.

It has been found according to the present process that the graft polymer produced is excellent in impact strength and weatherability, or resistance to weathering, when the graft polymerization ratio of monomer is at least one part per 100 parts of vinyl chloride resin. On the other hand, if this ratio is over 30 parts for each 100 parts of vinyl chloride resin, the tensile strength of the resulting graft polymer is decreased to below a half of that of the vinyl chloride resin used as a raw material, and the hardness, as measured by needle penetration temperature, is reduced to below about 10° C. Therefore, in addition to the reasons noted above, the graft polymerization ratio of the above monomer is particularly preferred to be in the range of from one to 30 parts to 100 parts of resin.

When the graft polymerization ratio of butadiene is less than 6 parts per 100 parts of vinyl chloride resin, the resulting graft polymer is generally not sufficiently improved in impact strength. If the ratio is over 30 parts per 100 parts, the flowability of the resulting graft polymer when heated is decreased to less than a quarter of that of the resin used as a raw material. Then not only does the moldability become poor and the thermal stability worsen, but also the tensile strength is decreased to less than half that of vinyl chloride resin used as a raw material. Therefore, the graft polymerization ratio of butadiene is preferably in the range of from about 6 to about 30 parts for each 100 parts of resin.

The process of this invention can be carried out over a range of temperatures and pressures which will permit the butadiene to be in the gaseous phase. Pressures which are above or below atmospheric can be used, and atmospheric or slightly greater pressures are preferred.

The time of irradiation is varied with intensity and total dosage to obtain the desired degree and completeness of polymerization. Generally times of from about one to about twelve hours are used.

The graft polymer obtained by the process of the present invention is characterized by being excellent not only in impact strength but also in weatherability. Particularly, the graft polymer obtained by impregnating vinyl chloride resin powder with monomer and thereafter contacting it with gaseous butadiene is superior to that prepared by mixing the monomer and butadiene in liquid state. Moreover, according to the process of the present invention, the conversion ratio of the monomer and butadiene used is high, and the graft polymerization ratio is high for the vinyl chloride resin. Thus, the process of the present invention is advantageously higher in its efficiency of utilizing monomer and butadiene and in graft polymerization efficiency in comparison with the conventional process. Such advantages will be clearer from a consideration of the following examples and comparisons.

In the examples and comparisons, the preparation of the sample for testing is carried out as follows:

One hundred parts of graft polymer obtained according to the process under consideration is admixed with 3 parts of Stann 100R–1 stabilizer, (manufactured by Sankyo Organic Synthesis Co., Ltd.) and mixed well. The mixture is milled on rolls at 185° C. for 5 minutes and thereafter formed in a press at 185° C. for 5 minutes to obtain a sheet having a given thickness.

An Izod impact test is carried out by cutting a test specimen 63.6 mm. in length, 12.7 mm. in width and 3 mm. in thickness from the sheet obtained in the above operation of preparing a sample, and providing a standard V-notch. The impact strength value at $20 \pm 1°$ C. is measured by an impact testing machine having a capacity of 10 ft.-lb.

The ultraviolet exposure test is carried out by placing a test specimen having the same size used in the Izod impact test in a Weather-Ometer (WE–2 type, manufactured by Toyo Rika Co., Ltd.) and, after exposure to ultraviolet radiation for a standard time, the impact strength value is measured.

The following examples are given to illustrate embodiments of the invention as it is presently preferred to practice it. It will be understood that these examples are illustrative, and the invention is not to be considered as restricted thereto except as indicated in the appended claims.

EXAMPLE I

One hundred grams of polyvinyl chloride powder (average polymerization degree, 1050; average particle size, 150 mesh) obtained by suspension polymerization is placed in a kneader, and 20 g. of methyl methacrylate is gradually added dropwise from a dropping funnel with agitation. The ingredients are mixed well to homogeneously impregnate the polyvinyl chloride with methyl methacrylate. The polyvinyl chloride resin impregnated with methyl methacrylate is not different from the original polyvinyl chloride resin in appearance and is not sticky. The impregnated resin is charged into a reaction vessel consisting of a vertical glass cylinder 25 mm. in inside diameter and 400 mm. in length and provided with glass stopcocks at the top and bottom ends. After replacing the air in the reaction vessel with gaseous butadiene, the cock at the top end is closed, the cock at the bottom is opened. While supplying gaseous butadiene through the bottom stop cock so that the pressure within the reaction vessel is always maintained at a constant pressure of 770 mm. Hg, gamma radiation from $Co^{60}$ is provided to the reaction vessel at a dose rate of $1.7 \times 10^4$ Röntgen per hour for 4 hours to carry out the graft polymerization.

The graft polymer so obtained is washed well with petroleum ether, dried in vacuum, and then weighed. Calculating from the increase of weight, its degree of grafting was 38.5%. The 20 g. of methacrylate charged is found to have been almost entirely graft-polymerized since hardly any methyl methacrylate is recovered from the petroleum ether used for washing. That is, the utilization efficiency of methacrylate is almost 100%.

As a result of carrying out an Izod impact test on a test specimen taken from the graft polymer so obtained, its Izod impact value is found to be 148 kg.-cm./cm.$^2$ and, after exposure in the Weather-Ometer for 200 hours, 100 kg.-cm./cm.$^2$.

EXAMPLE II

A graft polymerization is carried out in the same manner as in Example I except that 10 g. of ethyl acrylate is substituted for the 20 g. of methyl methacrylate in Example I.

After irradiating with ionizing radiation for 5 hours, the conversion ratio of ethyl acrylate is approximately 100% and the degree of grafting is 19.5%. The Izod impact value is 106.5 kg.-cm/cm.$^2$ and, after exposure in the Weather-Ometer for 200 hours, 75 kg.-cm./cm.$^2$.

EXAMPLE III

A graft polymerization is carried out in the same manner as in Example I except that 20 g. of n-butyl methacrylate is substituted for the 20 g. of methyl methacrylate.

After irradiation with ionizing radiation for two hours, a graft polymer is obtained with a grafting degree of 26.5%. When the above product is extracted, 4 g. of unpolymerized material is obtained. Thus, the conversion ratio of n-butyl methacrylate is 80%.

The Izod impact value is 108.8 kg.-cm./cm.$^2$ and, after exposure in the Weather-Ometer for 200 hours, 80 kg.-cm./cm.$^2$.

EXAMPLE IV

A graft polymerization is carried out in the same manner as in Example I substituting 10 g. of 2-ethylhexyl acrylate for the 20 g. of methyl methacrylate and maintaining butadiene gas in the reaction vessel at 780 mm. Hg.

After exposure to ionizing radiation for 1.5 hours, a graft polymer is obtained. In this case the conversion ratio of 2-ethylhexyl acrylate is 100%, and the degree of grafting is 17.4%.

The Izod impact value is 94.5 kg.-cm./cm.$^2$ and, after exposure in the Weather-Ometer, 83 kg.-cm./cm.$^2$.

EXAMPLE V 2-ethylhexyl acrylate and butadiene are graft-polymerized to a copolymer of vinyl acetate and vinyl chloride (vinyl acetate 5%; average polymerization degree, 950– powder; trademark Nipolit ML; manufactured by Chisso Co., Ltd.) in the same manner as in Example IV.

The conversion rate of 2-ethylhexyl acrylate monomer can be regarded as being 100% since the monomer cannot be found in the graft polymer thus obtained. The degree of grafting is 16.8%.

The Izod impact value is 90.4 kg.-cm./cm.$^2$ and, after exposure in the Weather-Ometer for 200 hours, 81.0 kg.-cm./cm.$^2$.

For comparison the Izod impact value of the copolymer of vinyl acetate and vinyl chloride used as the raw material is measured and found to be 3.1 kg.-cm./cm.$^2$.

EXAMPLE VI 2-ethylhexyl acrylate and butadiene are graft-polymerized to chlorinated polyvinyl chloride powder containing 61.5% of chlorine in the same manner as in Example IV except that the mixture is irradiated with ionizing radiation for 5 hours.

The conversion ratio of 2-ethylhexyl acrylate can be regarded as 100% since monomer cannot be found in the graft polymer product. The degree of grafting is 17.9%.

The Izod impact value is 72.3 kg.-cm./cm.$^2$ and, after exposure to the Weather-Ometer for 200 hours, 64.7 kg.-cm./cm.$^2$.

For comparison the Izod impact value of the chlorinated polyvinyl chloride used as the raw material is measured and found to be 1.8 kg.-cm./cm.$^2$.

COMPARISON SAMPLE 1

This sample corresponds to Example IV, but liquid butadiene is added to the polyvinyl chloride powder previously impregnated with 2-ethylhexyl acrylate to graft polymerize the 2-ethylhexyl acrylate and butadiene to the polyvinyl chloride. One hundred grams of polyvinyl chloride powder as described in Example I is first placed in a grinding mill, and 10 g. of 2-ethylhexyl acrylate is added thereto under agitation at ordinary temperatures to homogeneously impregnate the polyvinyl chloride with 2-ethylhexyl acrylate.

A mixture of 200 g. of deionized water, 0.1 g. of nonionic surface active agent, and 110 g. of the above polyvinyl chloride powder impregnated with 2-ethylhexyl acrylate is placed in a stainless steel polymerization reaction vessel provided with a stirrer and vigorously stirred to make a slurry. Subsequently, 20 g. of liquid butadiene is pumped in and, while maintaining the butadiene in the liquid state, the slurry is irradiated with gamma rays from Co$^{60}$ at a dose rate of $2.8 \times 10^4$ Röntgen per hour at a temperature of 30° C. for 2 hours.

After irradiation, the slurry is filtered, dried, washed with methanol, and thereafter dried in vacuum to obtain 120 g. of powdery graft polymer. The degree of grafting is 20%. The conversion rate of 2-ethylhexyl acrylate can be regarded as being 100% since only a trace of 2-ethylhexyl acrylate is found in the reaction mixture.

The Izod impact value of the above graft polymer is 95 kg.-cm./cm.$^2$ and, after exposure in the Weather-Ometer for 200 hours, 52 kg.-cm./cm.$^2$.

COMPARISON SAMPLE 2

This sample corresponds to Example IV and Comparison Sample 1. For this sample, 2-ethylhexyl acrylate and butadiene are graft polymerized to polyvinyl chloride according to a process which comprises previously mixing 2-ethylhexyl acrylate with liquid butadiene to make a liquid mixture, impregnating polyvinyl chloride with the liquid mixture, and treating according to the procedure for Comparison Sample 1.

A mixture of 200 g. of deionized water, 0.1 g. of nonionic surface active agent, and 100 g. of the same polyvinyl chloride powder as used in Comparison Sample 1 is placed in the same reaction vessel and vigorously stirred to make a slurry. Then a mixture of 10 g. of 2-ethylhexyl acrylate and 20 g. of liquid butadiene is pumped in.

The slurry is irradiated with Gamma rays from Co$^{60}$ at a dose rate of $2.8 \times 10^4$ Röntgen per hour and a temperature of 30° C. for 2 hours. After stopping the irradiation, the same treatment as in Sample 1 is carried out to obtain 119.5 g. of graft polymer powder having a degree of grafting of 19.5%. The copolymer contains 5.0% of 2-ethylhexyl acrylate and 14.5% butadiene. The Izod impact value of the graft polymer is 85 kg.-cm./cm.$^2$ and, after exposure in the Weather-Ometer for 200 hours, 44.5 kg.-cm./cm.$^2$.

COMPARISON SAMPLE 3

In the same manner as in Example I except that methacrylate is not added and the irradiation time is 2.5 hours, polyvinyl chloride is graft polymerized with butadiene having a degree of grafting of 9.6%.

The Izod impact value of this graft polymer is 103 kg.-cm./cm.$^2$ and, after exposure in the Weather-Ometer for 200 hours, 13 kg.-cm./cm.$^2$.

COMPARISON SAMPLE 4

The graft polymer is obtained in the same manner as in Sample 3 except that the irradiation time is 10 hours and the degree of grafting is 18%.

The Izod impact value of this graft polymer is 150 kg.-cm./cm.$^2$ and, after exposure in the Weather-Ometer for 200 hours, 30 kg.-cm./cm.$^2$.

COMPARISON SAMPLE 5

The graft polymer is produced in the same manner as Sample 3 except that the irradiation time is 17 hours and the degree of grafting is 26%.

The Izod impact value of this graft polymer is over 150 kg.-cm./cm.$^2$ and, after exposure in the Weather-Ometer for 200 hours, 45 kg.-cm./cm.$^2$.

COMPARISON SAMPLE 6

By the same process as in Example IV except that 2-ethylhexyl acrylate is not used and the irradiation time is 8.5 hours, a vinyl chloride polymer graft polymerized with butadiene having a degree of grafting of 17% is obtained.

The Izod impact value of this graft polymer is 140 kg.-cm./cm.$^2$ and, after exposure to the Weather-Ometer for 200 hours, 22 kg.-cm./cm.$^2$.

COMPARISON SAMPLE 7

This sample corresponds to Example IV and Sample 1 and is obtained by the same operation as Sample 1 except that 2-ethylhexylacrylate is not used, and the irradiation time is 6 hours.

A polyvinyl chloride graft-polymerized with butadiene and having a degree of grafting of 20% is obtained.

The Izod impact of this graft polymer is 99 kg.-cm./cm.$^2$ and after exposure in the Weather-Ometer for 200 hours, 9.5 kg.-cm./cm.$^2$.

The results of Examples I–VI and the Comparison Samples are summarized in Table I.

invention is evidently superior to the conventional graft polymer is weatherability for a given impact strength.

What is claimed is:

1. A process for preparing high-impact resins comprising impregnating a vinyl chloride homopolymer or copolymer powder with at least one alkyl acrylate or methacrylate monomer and irradiating the impregnated powder with ionizing radiation in the presence of gaseous butadiene to produce a graft polymerized resin, wherein the quantity of acrylate or methacrylate monomer is from one to fifty parts for each 100 parts of polymer or copolymer powder and the quantity of butadiene is from six to thirty parts for each 100 parts of homopolymer or copolymer powder.

2. A process according to claim 1 wherein the quantity of acrylate or methacrylate monomer is from one to thirty parts for each 100 parts of resin powder.

3. A process according to claim 1 wherein the total irradiation dose is from $10^3$ to $10^8$ rads.

4. A process according to claim 1 wherein the alkyl group contains from one to eight carbon atoms.

5. A process according to claim 1 wherein the vinyl chloride homopolymer or copolymer is produced by suspension polymerization.

TABLE I

| | Monomer | Resin | Degree of grafting (percent) | Izod impact (kg.-cm./cm.$^2$) | |
|---|---|---|---|---|---|
| | | | | Before expos.[1] | After expos.[1] |
| Example: | | | | | |
| I | Methylmethacrylate butadiene | Polyvinyl chloride | 38.5 | 148 | 100 |
| II | Ethylacrylate butadiene | do | 19.5 | 106.5 | 75 |
| III | n-Butylmethacrylate butadiene | do | 26.5 | 180.8 | 80 |
| IV | 2-ethylhexylacrylate butadiene | do | 17.4 | 94.5 | 83 |
| V | do | Copolymer | 16.8 | 90.4 | 81 |
| VI | do | Chlorinated polyvinyl chloride | 17.9 | 72.3 | 64.7 |
| Sample: | | | | | |
| 1 | 2-ethylhexyl acrylate butadiene | Polyvinyl chloride | 20 | 95 | 52 |
| 2 | do | do | 19.5 | 85 | 44.5 |
| 3 | Butadiene | do | 9.6 | 103 | 13 |
| 4 | do | do | 18 | 150 | 30 |
| 5 | do | do | 26 | >150 | 45 |
| 6 | do | do | 17 | 140 | 22 |
| 7 | do | do | 20 | 99 | 9.5 |

[1] In Weather-Ometer.

According to the various values shown in Table I, the polyvinyl chloride graft polymerized with acrylate or methacrylate and butadiene is higher in impact strength after exposure in the Weather-Ometer than that graft-polymerized with butadiene only, and therefore is much better in weatherability. Also, from the impact strength value after exposure in the Weather-Ometer, the polyvinyl chloride graft polymerizsed with an acrylate or methacrylate and butadiene is quite useful, and further, such graft polymer is higher in impact strength and excellent in weatherability by comparison to Samples 1 and 2 in which butadiene is maintained in liquid state. Thus, the graft polymer according to the process of the present 6. A process according to claim 1 wherein the vinyl chloride homopolymer or copolymer powder is additionally impregnated with a styrene monomer.

References Cited

UNITED STATES PATENTS 2,983,657   5/1961   Gabilly et al. _____ 204—159.17
3,327,022   6/1967   Riou et al.

MURRAY TILLMAN, Primary Examiner

R. B. TURER, Assistant Examiner

U.S. Cl. X.R.

260—878, 879, 884, 885